(12) United States Patent
Tanaka et al.

(10) Patent No.: US 9,581,480 B2
(45) Date of Patent: Feb. 28, 2017

(54) MICRO FLOW SENSOR

(71) Applicant: YOKOGAWA ELECTRIC CORPORATION, Tokyo (JP)

(72) Inventors: Yoshiaki Tanaka, Tokyo (JP); Minako Terao, Tokyo (JP); Hiroaki Tanaka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 13/906,121

(22) Filed: May 30, 2013

(65) Prior Publication Data

US 2013/0319105 A1  Dec. 5, 2013

(30) Foreign Application Priority Data

May 31, 2012  (JP) ................................. 2012-124744

(51) Int. Cl.
*G01F 15/14* (2006.01)
*G01F 15/00* (2006.01)
*G01F 1/684* (2006.01)

(52) U.S. Cl.
CPC .......... *G01F 1/6845* (2013.01); *G01F 1/6842* (2013.01); *G01F 1/6847* (2013.01); *G01F 15/00* (2013.01); *G01F 15/14* (2013.01)

(58) Field of Classification Search
CPC ............................. G01F 1/6842; G01F 1/6845
See application file for complete search history.

(56) References Cited

U.S. PATENT DOCUMENTS

| | | | |
|---|---|---|---|
| 2002/0078744 A1 | 6/2002 | Gehman et al. | |
| 2006/0000272 A1 | 1/2006 | Neuenschwander et al. | |
| 2007/0168150 A1 | 7/2007 | Hirata et al. | |
| 2008/0016959 A1* | 1/2008 | Nakano ................. | G01F 1/6845 73/204.26 |
| 2008/0196493 A1 | 8/2008 | Anzai et al. | |
| 2010/0162810 A1* | 7/2010 | Hasebe ................. | G01F 1/6845 73/204.26 |

(Continued)

FOREIGN PATENT DOCUMENTS

| | | | | |
|---|---|---|---|---|
| CA | WO 2010102403 A1 * | 9/2010 | .......... | G01F 1/6842 |
| DE | 19906100 A1 | 9/2000 | | |

(Continued)

OTHER PUBLICATIONS

Japan Patent Office Machine Translation of JP 2001317974 A, translated Dec. 9, 2014 22:44:19 JST.*

(Continued)

*Primary Examiner* — Robert Huber
*Assistant Examiner* — Herbert K Roberts
(74) *Attorney, Agent, or Firm* — Hauptman Ham, LLP

(57) ABSTRACT

A micro flow sensor includes: a flow path through which a fluid to be measured flows; a detection unit having a heater configured to heat the fluid to be measured in the flow path and temperature sensors configured to measure temperature of a fluid to be measured in the flow path; an arithmetic unit configured to measure a flow rate of the fluid to be measured flowing through the flow path based on the temperature of the fluid to be measured, measured by the temperature sensors; and a narrowed portion disposed on an upstream side of the detection unit in the flow path for narrowing the flow path.

8 Claims, 15 Drawing Sheets

(56) References Cited

U.S. PATENT DOCUMENTS

2012/0161256 A1  6/2012  Grudin et al.

FOREIGN PATENT DOCUMENTS

| EP | 1617185 A1 | | 1/2006 | |
|---|---|---|---|---|
| EP | 1959242 A2 | | 8/2008 | |
| JP | 2001317974 A | * | 11/2001 | |
| JP | 2006075679 A | * | 3/2006 | ............. B01J 19/00 |
| JP | 200882768 A | | 4/2008 | |
| JP | 2010-230388 A | | 10/2010 | |
| JP | 201257975 A | | 3/2012 | |
| KR | 100820653 B1 | | 4/2008 | |
| WO | 2010102403 A1 | | 9/2010 | |

OTHER PUBLICATIONS

Japan Patent Office Machine Translation of JP 2006075679 A, translated Dec. 11, 2014 00:14:45 JST.*
Yoshiaki Tanaka, etc., "micro flow sensor for microreactor", Yokogawa Technical Report, Yokogawa Electric Corporation, 2008, vol. 52, No. 4(2008), p. 39-42, with English abstract.

* cited by examiner

MICRO FLOW SENSOR

CROSS-REFERENCE TO RELATED APPLICATION

This application claims priority from Japanese Patent Application No. 2012-124744 filed with the Japan Patent Office on May 31, 2012, the entire content of which is hereby incorporated by reference.

BACKGROUND ART

1. Technical Field

The present disclosure relates to a micro flow sensor.

2. Related Art

A micro flow sensor measures a flow rate of a fluid by detecting a thermal transfer of a fluid. There have been proposed various types of micro flow sensors having flow paths and detection units integrated therein. For example, such micro flow sensors have been disclosed in Yoshiaki Tanaka and three others, "micro flow sensor for microreactor system", Yokogawa Technical Report, Yokogawa Electric Corporation, 2008, Vol. 52, No. 4 (2008), p. 39-42, and JP-A-2010-230388.

FIGS. 18A and 18B are diagrams illustrating the configuration of a flow sensor disclosed as a conventional example in JP-A-2010-230388. FIG. 18A is a perspective view of the flow sensor and FIG. 18B is a cross-sectional view thereof taken along line B-B in FIG. 18A.

The flow sensor a includes a flow sensor chip 2 and a flow path forming member 3. A lower surface 3a of the flow path forming member 3 is connected to an upper surface 2a of the flow sensor chip 2. A micro flow path 4 is formed between the flow path forming member 3 and the flow sensor chip 2. A fluid to be measured, such as a gas, flows through the flow path 4. The flow path forming member 3 is made of transparent glass chips. On both ends of the flow path 4, a fluid inlet 4a and a fluid outlet 4b are formed. The fluid inlet 4a and the fluid outlet 4b have openings on an upper surface 3b of the flow path forming member 3. A gas as a fluid to be measured is introduced into the flow path 4 via the fluid inlet 4a, flows through the flow path 4, and is led out of the fluid outlet 4b.

The flow sensor chip 2 includes a silicon base plate 5. As illustrated in FIG. 18B, an insulating film (thin film) 6 made of silicon nitride or silicon dioxide is formed on an upper surface of the silicon base plate 5. A flow rate detection unit 7 is formed at a position corresponding to a center of the flow path 4 on an upper surface of the insulating film 6. The flow rate detection unit 7 is coated with an insulating film 8 made of silicon nitride or silicon dioxide.

A cavity-like recess 2c is formed below the flow rate detection unit 7 in the center of the upper surface 2a of the flow sensor chip 2. Thus, a site, on the insulating film 6 including the flow rate detection unit 7 formed thereon, that covers the recess 2c is formed into a diaphragm shape. Thus, the flow rate detection unit 7 and the silicon base plate 5 are thermally blocked.

The flow rate detection unit 7 includes a heater and temperature measuring elements which are arranged on the insulating film 6. The temperature measuring elements are arranged on an upstream side and a downstream side at the same distance from the heater. The heater and the temperature measuring elements include, for example, platinum thin films. The flow rate detection unit 7 is configured to serve as a thermal detection unit. Furthermore, the flow rate detection unit 7 may include an ambient temperature sensor (not shown) disposed on the silicon base plate 5. When the heater of the flow rate detection unit 7 is energized, the heater is heated by a control circuit so as to be higher by a certain temperature than a temperature of a gas measured by the ambient temperature sensor. In this manner, the heater heats a gas flowing through the flow path 4.

While a gas does not flow through the flow path 4, the upstream side and the downstream side of the heater have a uniform temperature distribution. The temperature measuring element on the upstream side and the temperature measuring element on the downstream side exhibit resistance values corresponding to temperatures in a substantially equal manner. On the other hand, while a gas flows through the flow path 4, the uniform temperature distribution between the upstream side of the heater and the downstream side of the heater is lost. For example, the upstream side has a lower temperature, and the downstream side has a higher temperature. Then, a Wheatstone bridge circuit including the temperature measuring element on the upstream side and the temperature measuring element on the downstream side detects a difference in resistance value, that is a difference in temperature, between the temperature measuring elements. The flow sensor measures a flow rate of a gas flowing through the flow path 4 based on the detected temperature difference.

This flow sensor adopts a measurement principle of a so-called three-wire thermal system. In the three-wire thermal system, a temperature distribution to be formed by heating a heater is measured based on a temperature difference between two temperature sensors arranged on an upstream side and a downstream side of a heater at substantially equal distances from the heater. This temperature distribution depends on a flow rate. Therefore, the flow rate is calculated from this temperature distribution.

SUMMARY

A micro flow sensor includes: a flow path through which a fluid to be measured flows; a detection unit having a heater configured to heat the fluid to be measured in the flow path and temperature sensors configured to measure temperature of a fluid to be measured in the flow path; an arithmetic unit configured to measure a flow rate of the fluid to be measured flowing through the flow path based on the temperature of the fluid to be measured, measured by the temperature sensors; and a narrowed portion disposed on an upstream side of the detection unit in the flow path for narrowing the flow path.

DETAILED DESCRIPTION

Figure 1A:
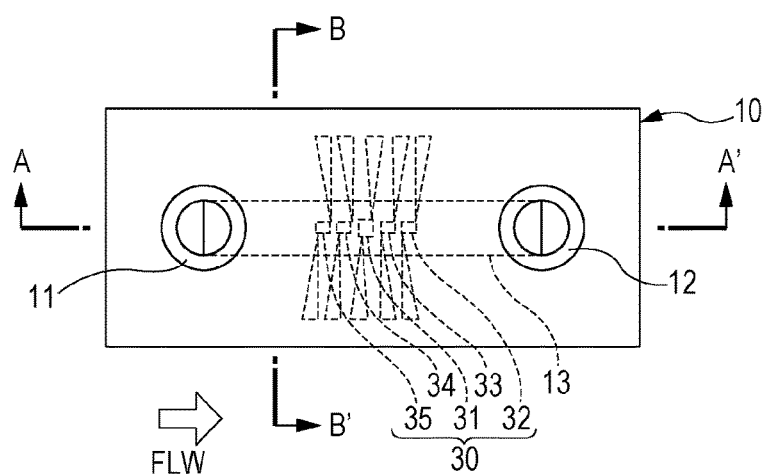
FIGS. 1A to 1C are diagrams illustrating an exemplary configuration of a micro flow sensor according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 18A:
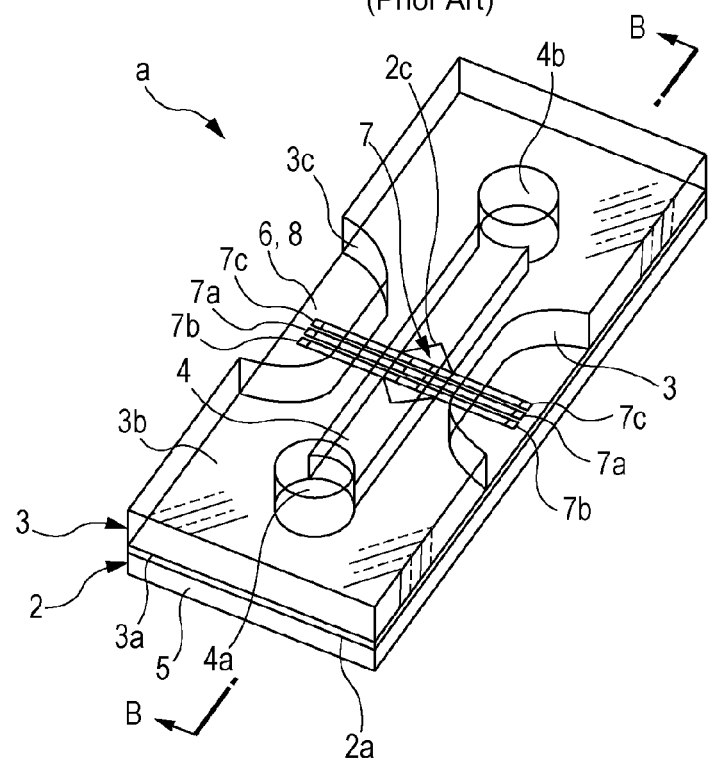
FIGS. 18A and 18B are diagrams illustrating an exemplary configuration of a conventional micro flow sensor.
Figure 18B:
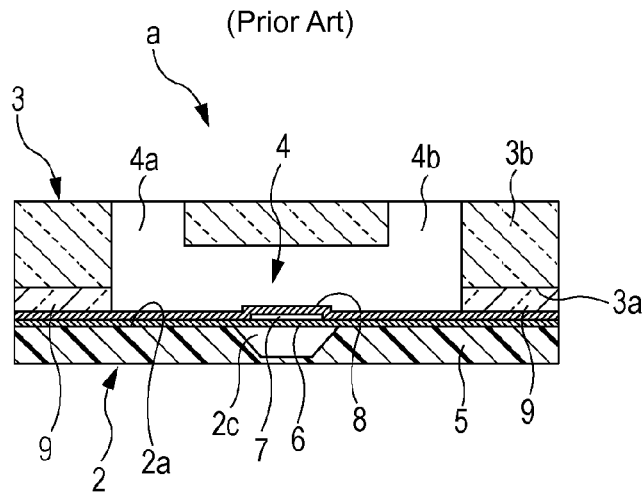

The flow path 4 of the flow sensor illustrated in FIG. 18 has a linear shape. For this reason, when a disturbance of a flow velocity distribution due to an influence of a piping occurs, for example, on the upstream side of the flow sensor, such an influence reaches the detection unit of the flow sensor without any changes. As a result, reproducibility of a flow velocity distribution and a flow rate measurement value tends to considerably decrease.

In general, a fluid flowing through a flow path has a flow velocity distribution that depends on a state and a flow rate of the flow path. A flow velocity distribution in a given location mainly depends on a state of a flow path in an upstream side of the given location. As a fluid continues to flow through the flow path, the flow velocity distribution changes. As known, the degree of change in flow velocity distribution gradually decreases toward a downstream side. Then, the change terminates at a certain degree, and a flow velocity distribution in a downstream side of the stopped location is fixed. The region with a changing flow velocity distribution is referred to as an "entrance region". The length to the position where the change terminates and a flow velocity distribution is fixed is referred to as an "entrance length".

The measurement value of a flow sensor depends on a flow velocity distribution in principle and in practical use. In particular, in the flow sensor having a form disclosed in JP-A-2010-230388, the detection unit is disposed on a part of the flow path wall. Therefore, the measurement value of this flow sensor strongly depends on a flow velocity distribution. For example, a piping arrangement located immediately upstream of the flow sensor influences the flow velocity distribution in the detection unit. As a result, reproducibility of a flow rate measurement value decreases.

Therefore, it is important to fix the flow velocity distribution in the detection unit in order to improve accuracy or reproducibility of a measurement. In order to fix the flow velocity distribution, an entrance region is disposed on an upstream side of the flow sensor. The entrance region has an entrance length (a straight pipe length) of a certain length (for example, about 70 times a pipe diameter). Thus, a flow rate measurement value may change when a bent pipe, a valve, or other fluid devices is coupled to any part of this entrance region When the entrance region is made longer, it results in a difficulty in downsizing of an entire apparatus in which the flow sensor is incorporated.

An object of this disclosure is to provide a micro flow sensor for detecting a thermal transfer of a fluid in order to measure a flow rate of a fluid. The small-sized micro flow sensor has excellent reproducibility of a flow velocity distribution and a flow rate measurement value.

Furthermore, another object of this disclosure is to provide a micro flow sensor that has excellent corrosion resistance and chemical resistance, high stability, and a small zero point shift and a broad measurement flow rate range.

The micro flow sensor (the present flow sensor) according to the present disclosure includes: a flow path through which a fluid to be measured flows; a detection unit having a heater for heating a fluid to be measured in the flow path and temperature sensors for measuring temperature of a fluid to be measured in the flow path; an arithmetic unit for measuring a flow rate of a fluid to be measured flowing in the flow path based on the temperature of a fluid to be measured measured by the temperature sensors; and a narrowed portion disposed on an upstream side of the detection unit in the flow path for narrowing the flow path.

The temperature sensors may include upstream sensors arranged on an upstream side of the heater and downstream sensors arranged on a downstream side of the heater. In this case, a distance between the upstream sensors and the heater may be equal to a distance between the downstream sensors and the heater. Furthermore, the upstream sensors may include a first upstream sensor and a second upstream sensor, and the downstream sensors may include a first downstream sensor and a second downstream sensor. In this case, the distance between the first upstream sensor and the heater may be equal to the distance between the first downstream sensor and the heater, and the distance between the second upstream sensor and the heater may be equal to the distance between the second downstream sensor and the heater.

The present flow sensor may include a first base plate and a second base plate, both connected to each other. At least one of the base plates may have a groove for defining the flow path. The first base plate may have two holes in communication with the flow path, and the second base plate may include the detection unit arranged on an outside thereof so as to overlap the flow path. The detection unit may include the heater and the plurality of temperature sensors equally spaced from each other.

In this configuration, one of the holes may be an inlet for introducing a fluid into the flow path. The narrowed portion may include a stepped portion formed in a boundary between the groove and the inlet.

Also, in this configuration, each of the first and second base plates has a groove for defining the flow path. A width Du of a groove in the second base plate and a width Dd of a groove in the first base plate may satisfy a relationship of Du≤Dd.

Furthermore, in the present flow sensor, the flow path may include a tubular body.

Furthermore, in the present flow sensor, a flow rate is detected based on detection results of the downstream sensors, and then the obtained flow rate may be corrected with detection results of the upstream sensors.

The present flow sensor has the narrowed portion for narrowing the flow path. Thus, a fluid flow velocity distribution is stabilized in a downstream side of the narrowed portion. As a result, the present flow sensor has high reproducibility of a flow velocity distribution and a flow rate measurement value.

In the present flow sensor, the fluid flow velocity distribution in an upstream side of a narrowed portion is once canceled by the narrowed portion. The flow velocity distribution immediately below the narrowed portion depends on the shape of the narrowed portion. Also, an entrance region starts again from the narrowed portion in a downstream side of the narrowed portion. The present flow sensor takes advantage of the above-described fluid characteristics.

As described above, in the present flow sensor, a fluid flow velocity distribution corresponds to the shape of the narrowed portion. Thus, an influence of the flow velocity distribution in an upstream side of the narrowed portion is reduced. Furthermore, in the present flow sensor, the narrowed portion acts like a rectifier. That is, the narrowed portion causes the flow velocity distribution immediately below the narrowed portion to correspond to the shape of the narrowed portion.

In the present flow sensor, the detection unit may be disposed at a position depending on an entrance region. The entrance region is a region with a changing flow velocity distribution in a flow path. The flow velocity distribution detected by the detection unit is substantially uniquely determined according to a shape of the narrowed portion and a distance from the narrowed portion. Therefore, an influence of a piping arranged on an upstream side of the present flow sensor can be eliminated. Therefore, reproducibility of a flow rate measurement value is improved.

Figure 1C:
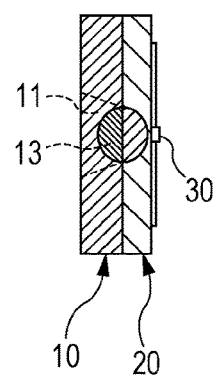
Figure 1B:
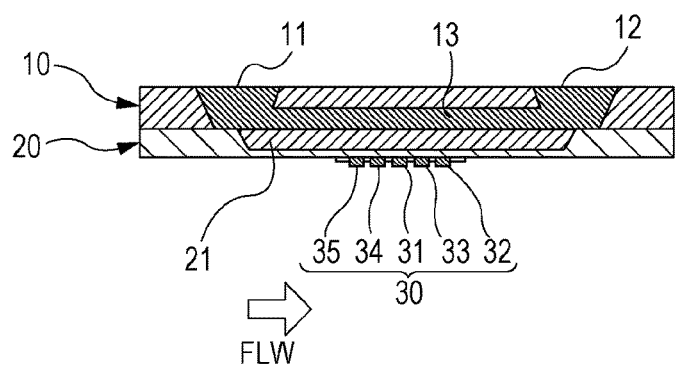

FIGS. 1A to 1C are diagrams illustrating an exemplary configuration of the micro flow sensor (the present flow sensor) according to the present embodiment. FIG. 1A is a plan view of the micro flow sensor, FIG. 1B is a cross-sectional view thereof taken along line A-A' in FIG. 1A, and FIG. 1C is a cross-sectional view thereof taken along line B-B' in FIG. 1A.

As illustrated in FIGS. 1A to 1C, in the present flow sensor, a base plate (a first base plate) 10 and a base plate (a second base plate) 20 are connected to each other by bonding.

These two base plates of the base plate 10 and the base plate 20 are made of, for example, glass such as Pyrex (registered trademark). The base plate 10 and the base plate 20 are processed into their respective predetermined shapes by a semiconductor process. In this flow sensor, a fluid to be measured, such as a gas or a liquid, enters an inlet IN on one end of a flow path FP, flows through the flow path FP in a direction indicated by arrow FLW, and exits an outlet OUT on the other end of the flow path FP.

The base plate 10 on one hand includes a hole 11 and a hole 12 disposed at a predetermined distance therebetween. Regarding each of two holes of the hole 11 and the hole 12, an opening diameter on a connection surface with the base plate 20 on the other hand is formed so as to be smaller than an opening diameter on the other surface. Furthermore, a groove 13 is disposed on the connection surfaces, of these two holes 11 and 12, with the base plate 20. The groove 13 has a width approximately equal to the opening diameters of the holes 11 and 12. This groove 13 defines the flow path FP. Also, the hole 11 defines the inlet IN of the flow path FP, and the hole 12 defines the outlet OUT of the flow path FP. The holes 11 and 12 as well as the groove 13 are processed by, for example, sand blasting.

A groove 21 is disposed on a connection surface, of the base plate 20 on the other hand, with the base plate 10. The groove 21 is overlapped with the groove 13. Thus, the groove 21 is integrated with the groove 13 to constitute the flow path FP.

A detection unit 30 is arranged near the center of the groove 21 (the flow path FP) on the other surface of the base plate 20. The detection unit 30 includes a heater 31 and a plurality of temperature sensors 32 to 35.

The heater 31 and the plurality of temperature sensors 32 to 35 are substantially equally spaced from each other with the heater 31 located in the center thereof, in a manner substantially orthogonal to the groove 21. The heater 31 and the plurality of temperature sensors 32 to 35 are made of, for example, platinum thin films. Also, land patterns for external connection are disposed on both ends of the heater 31 and the temperature sensors 32 to 35.

Figure 2A:
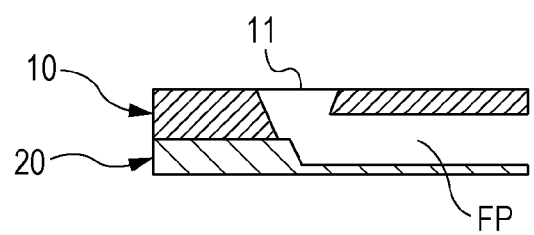
FIGS. 2A to 2C are enlarged views of different examples of an inner wall portion of a hole of the micro flow sensor illustrated in FIG. 1B.
Figure 2B:
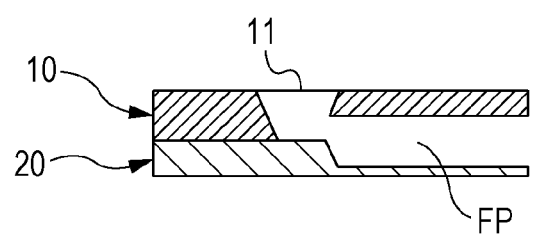
Figure 2C:
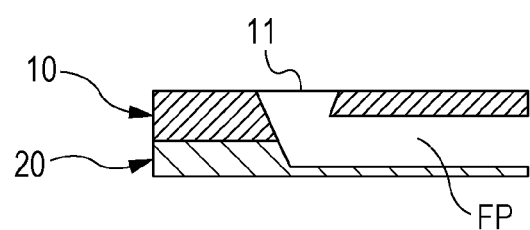

FIGS. 2A to 2C are enlarged views of different examples of an inner wall portion of a hole 11 of the micro flow sensor. The hole 11 constitutes an inlet of a flow path FP. As illustrated in FIGS. 2A and 2B, a stepped portion may be disposed between a base plate 10 and a base plate 20. As illustrated in FIG. 2C, a stepped portion may not be disposed between a base plate 10 and a base plate 20. The stepped portions illustrated in FIGS. 2A and 2B function as a narrowed portion. That is, these stepped portions (narrowed portions) function so as to narrow the flow path FP (to reduce a cross-sectional area (a diameter) of the flow path FP).

In examples illustrated in FIGS. 2A and 2B, the stepped portions each are formed in a boundary (or an inner wall of the hole 11) between the hole 11 formed in the base plate 10 and the groove 21 (see FIG. 1B) formed in the base plate 20. These stepped portions can be manufactured as a narrowed portion providing a desired effect, by adjusting a dimension of the groove 21 or the hole 11. A special design or process for manufacturing a narrowed portion is not necessary.

Figure 3A:
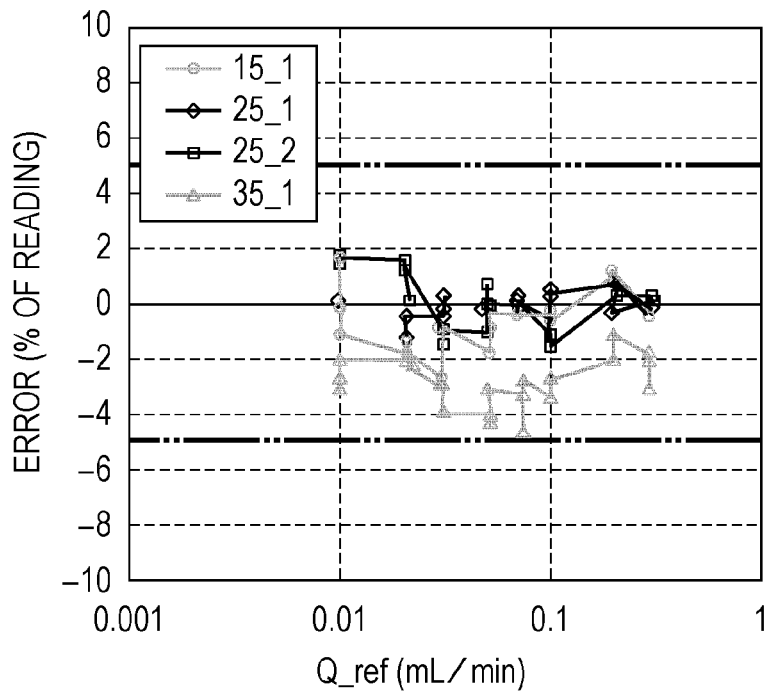
FIGS. 3A and 3B are diagrams illustrating examples of evaluated characteristics for reproducibility of flow rate measurement values for the micro flow sensors with/without a stepped portion (a narrowed portion) illustrated in FIGS. 2A to 2C, respectively.
Figure 3B:
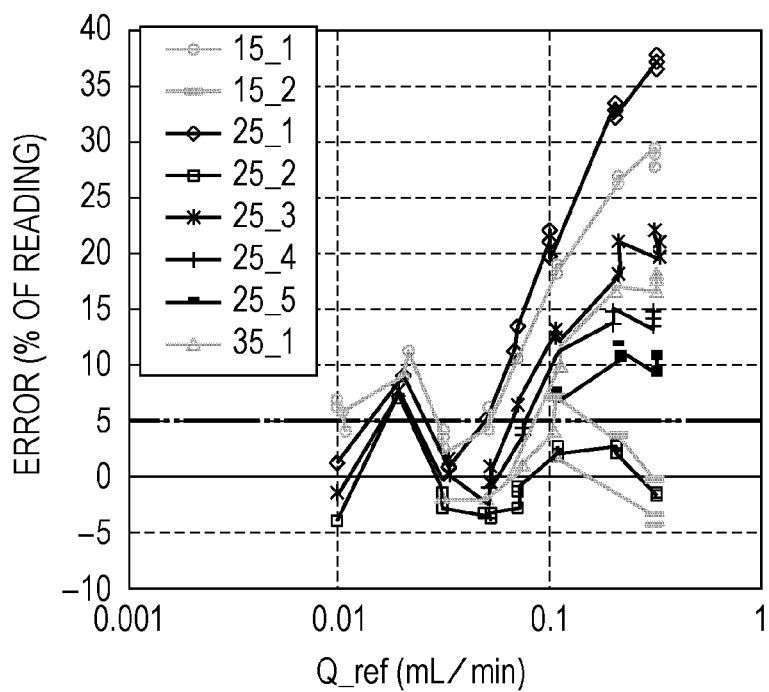

FIGS. 3A and 3B are diagrams illustrating examples of evaluated characteristics for reproducibility of flow rate measurement values for the micro flow sensors with/without a stepped portion (a narrowed portion) illustrated in FIGS. 2A to 2C, respectively. FIG. 3A depicts evaluated characteristics with a stepped portion (a narrowed portion). FIG. 3B depicts evaluated characteristics without a stepped portion (a narrowed portion). As illustrated in FIG. 3A, with a stepped portion (a narrowed portion), the largest amount of change in measurement value remains around 2%. On the other hand, as illustrated in FIG. 3B, without a stepped portion (a narrowed portion), the largest amount of change in measurement value reaches, for example, almost 40% in a high flow rate region of 0.25 mL/min. Therefore, disposition of a stepped portion (a narrowed portion) clearly improves the reproducibility.

Thus, a flow velocity distribution detected by the detection unit 30 is substantially uniquely determined according to a shape of a narrowed portion and a distance from the narrowed portion. Therefore, an influence of a piping arranged on an upstream side of the present flow sensor can be eliminated. For this reason, reproducibility of a flow rate measurement value is improved.

As illustrated in FIG. 1C, the base plate 10 having the groove 13 and the base plate 20 having the groove 21 are connected to each other. This allows the flow path FP to be defined. The groove 13 and the groove 21 each have a cross section of a substantially semicircular shape. Here, the groove 13 and the groove 21 each have a dimensional tolerance associated with processing. Therefore, as illustrated in FIGS. 4A and 4B, a step is formed on a connection surface between the base plate 10 and the base plate 20.

This step on the flow path wall has a position to be formed and a function both different from those of the stepped portion illustrated in FIG. 1B, FIG. 2A, and FIG. 2B. In an example illustrated in FIG. 4A, a width (Du) of the groove 21 in the base plate 20 having the detection unit 30 disposed thereon is wider than a width (Dd) of the groove 13 in the base plate 10 without having the detection unit 30 (Du>Dd). In an example illustrated in FIG. 4B, a width (Du) of the groove 21 in the base plate 20 is narrower than a width (Dd) of the groove 13 in the base plate 10 (Du<Dd).

Figure 4A:
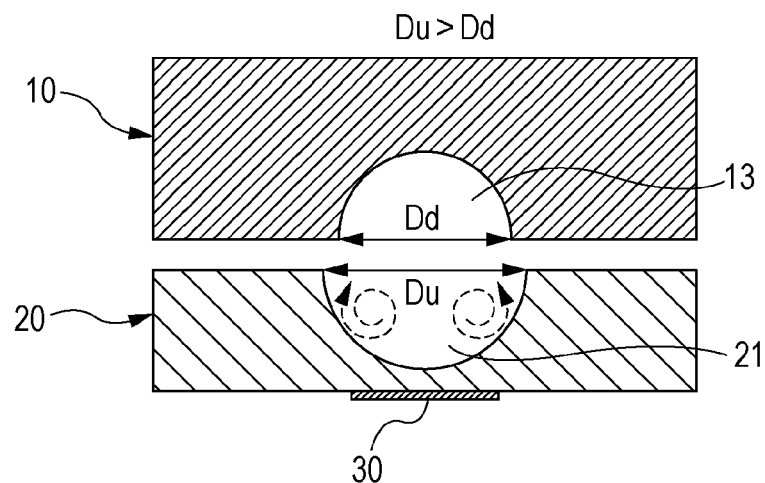
FIGS. 4A and 4B are diagrams each illustrating a difference between groove widths of flow path walls on a connection surface between two base plates in the micro flow sensor.
Figure 4B:
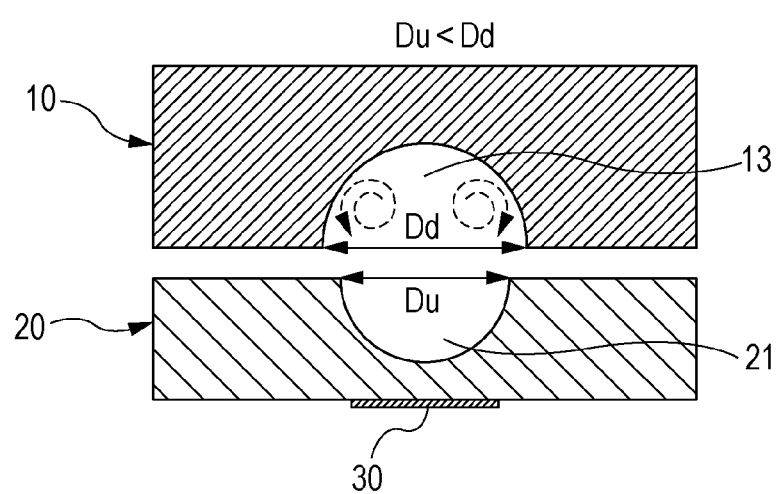

An eddy occurs in a groove having a wider width, of the groove 21 or the groove 13, due to the step formed on the flow path wall, as illustrated in FIG. 4A or FIG. 4B. In an example illustrated in FIG. 4A, an eddy occurs in the groove 21 of the base plate 20 having the detection unit 30 disposed thereon. In this case, variations in flow rate measurement value are increased.

Therefore, the width (Du) of the groove 21 in the base plate 20 is formed narrower than the width (Dd) of the groove 13 in the base plate 10 (Du<Dd) as illustrated in FIG. 4B. Thus, an eddy occurs in the groove 13 of the base plate 10 without having the detection unit 30 disposed thereon. Thus, the variations in flow rate measurement value caused by occurrence of an eddy are suppressed to be reduced.

Figure 5:
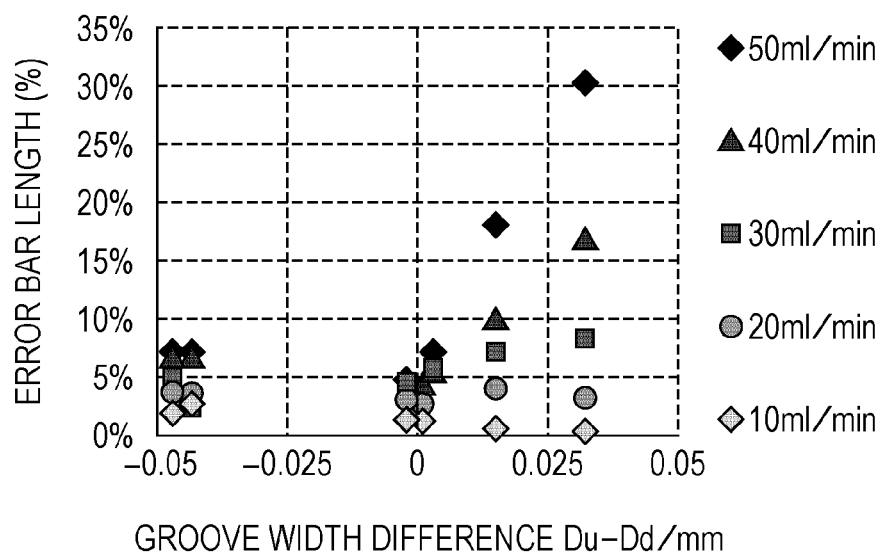
FIG. 5 is a diagram illustrating an example of evaluated characteristics exhibiting a relationship between the difference of the groove widths illustrated in each of FIGS. 4A and 4B and the reproducibility of a flow rate measurement value.

FIG. 5 is a diagram illustrating an example of evaluated characteristics exhibiting a relationship between the differences in groove width (Du–Dd) illustrated in FIGS. 4A and 4B and the reproducibility of a flow rate measurement value. According to the results illustrated in FIG. 5, the reproducibility of a flow rate measurement value is clearly improved by forming a groove so that a width Du of the groove 21 in the base plate 20 having the detection unit 30 disposed thereon and a width Dd of the groove 13 in the base plate 10 satisfy a relationship of Du≤Dd and by setting the difference (Dd-Du) between Du and Dd to be not larger than 10 μm.

An adhesive is not used for connecting two base plates of the base plate 10 and the base plate 20. For example, the connection is performed by a heat sealing process at a temperature higher than a temperature for performing connection with a low melting point glass. This inhibits an adhesive from eluting into a fluid to be measured. As a result, high chemical resistance and pressure resistance are obtained.

Two base plates of the base plate 10 and the base plate 20 are connected to each other by heat sealing thereby to define the flow path FP. Thereafter, a platinum thin film, for example, is deposited on a base plate 20 side using a semiconductor process such as sputtering or vapor deposition to form a predetermined shape. Thus, a detection unit 30 is formed. The detection unit 30 includes a heater 31 and temperature sensors 32 to 35. That is, connection of base plates is performed prior to forming a thin film resistance element (a detection unit 30). For this reason, heat sealing with which high corrosion resistance and pressure resistance are realized can be selected as a connection method.

Two base plates of the base plate 10 and the base plate 20 are connected to each other by heat sealing, and on an outside surface of the base plate 20, the detection unit 30 is disposed by sputtering or vapor deposition. For this reason, high stability based on high adhesive characteristics of the detection unit 30 to the base plate 20 is obtained. Furthermore, the heater 31 and the temperature sensors 32 to 35 can be inhibited from being directly exposed to a fluid to be measured. Thus, the detection unit 30 has improved corrosion resistance.

The detection unit 30 is preferably disposed in a central part of the present flow sensor. According to this configuration, in a temperature distribution formed by a heater at a flow rate of zero, an upstream side and a downstream side become symmetric. Therefore, occurrence of a zero point shift can be inhibited.

When the detection unit 30 is shifted from the central part, an upstream side and a downstream side are sometimes not symmetric in a temperature distribution at a flow rate of zero. In this case, changes in environment such as changes in ambient temperature cause a degree of asymmetry to be changed. As a result, a zero point of a flow rate measurement value is shifted. On the other hand, when the detection unit 30 is disposed in a central part thereby to maintain a symmetric temperature distribution, the symmetry characteristics of a temperature distribution is maintained even when changes in environment occur. That is, occurrence of a zero point shift can be inhibited.

In the present flow sensor, a flow rate is micro. Therefore, the size of the present flow sensor is small. For this reason, an example of a method of measuring a flow rate with the present flow sensor includes a method using heat. The method using heat includes three flow rate measurement systems described below.

In these systems, measurement can be performed with a detector disposed on a part of a flow path wall. Therefore, the measurement effect of the present flow sensor can be sufficiently exerted by applying these systems to the present flow sensor having a narrowed portion in an inlet.

That is, examples of a method for measuring a flow rate include (1) three-wire thermal system (differential system), (2) three-wire thermal system (difference/sum system), and (3) thermal system (TOF system).

Figure 6:
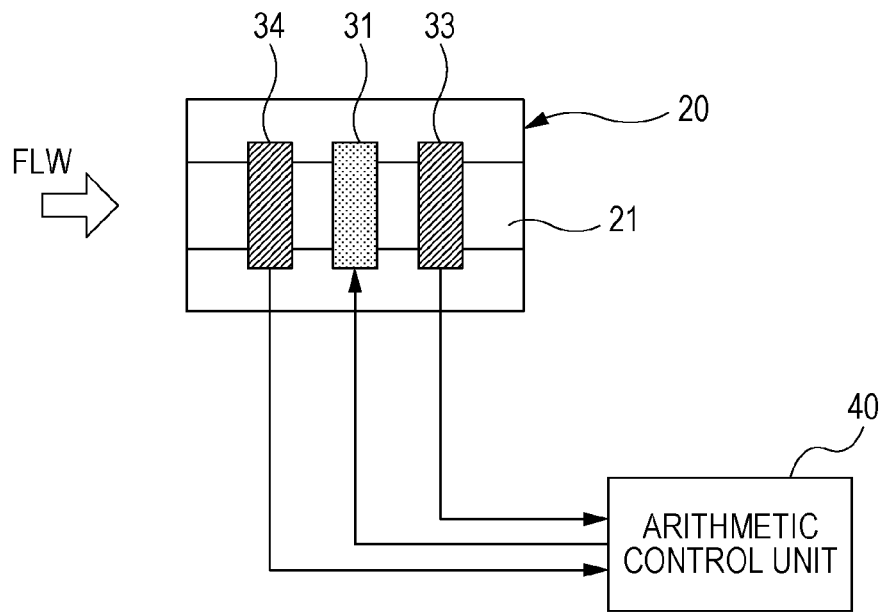
FIG. 6 is a diagram schematically illustrating the configuration of the micro flow sensor that performs a flow rate measurement with a three-wire system.

FIG. 6 is a diagram schematically illustrating the configuration of a micro flow sensor for measuring a flow rate by (1) or (2) three-wire thermal system. In FIG. 6, the same signs are assigned to the components in common with those in FIG. 1A. As illustrated in FIG. 6, a heater 31, a temperature sensor (a downstream sensor) 33, and a temperature sensor (an upstream sensor) 34 are connected to an arithmetic control unit (an arithmetic unit) 40.

The heater 31 is controlled by the arithmetic control unit 40. That is, the arithmetic control unit 40 controls the heater 31 so that a groove 21 defining a flow path FP has a certain temperature of a few degrees higher than a temperature of a fluid to be measured flowing through the flow path FP. In addition, the arithmetic control unit 40 performs a predetermined arithmetic process as described below, based on the measured temperature of the temperature sensor 33 and the measured temperature of the temperature sensor 34.

Figure 7:
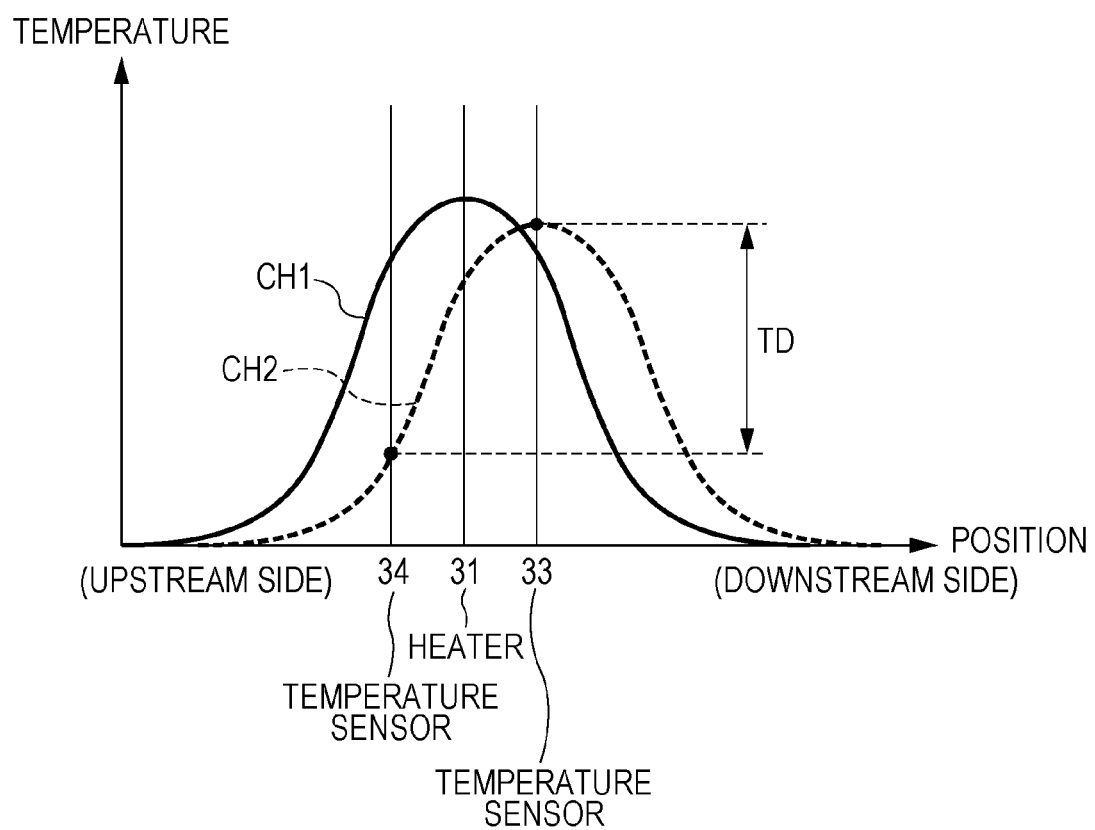
FIG. 7 is a diagram illustrating an example of temperature distribution characteristics obtained by the micro flow sensor illustrated in FIG. 6.

FIG. 7 is a diagram illustrating an example of temperature distribution characteristics obtained by the micro flow sensor illustrated in FIG. 6. In FIG. 7, characteristics CH1 indicated by a solid line is a temperature distribution when a fluid to be measured flowing through the flow path FP has a flow rate of zero. This temperature distribution has such a shape that an upstream side and a downstream side are symmetric about the heater 31. That is, a measured temperature of the temperature sensor 33 has almost the same value as a measured temperature of the temperature sensor 34.

When a fluid to be measured flows through the flow path FP, symmetry characteristics of the temperature distribution of characteristics CH1 is lost along a flowing direction of a fluid to be measured. This temperature distribution has a distortion as depicted by characteristics CH2 indicated by a broken line. A distortion amount of this temperature distribution depends on a flow rate of a fluid to be measured flowing through the flow path FP. That is, a difference in measured temperature (a temperature difference) TD between the temperature sensor 33 on an upstream side and the temperature sensor 34 on a downstream side depends on a flow rate of a fluid to be measured.

Figure 8A:
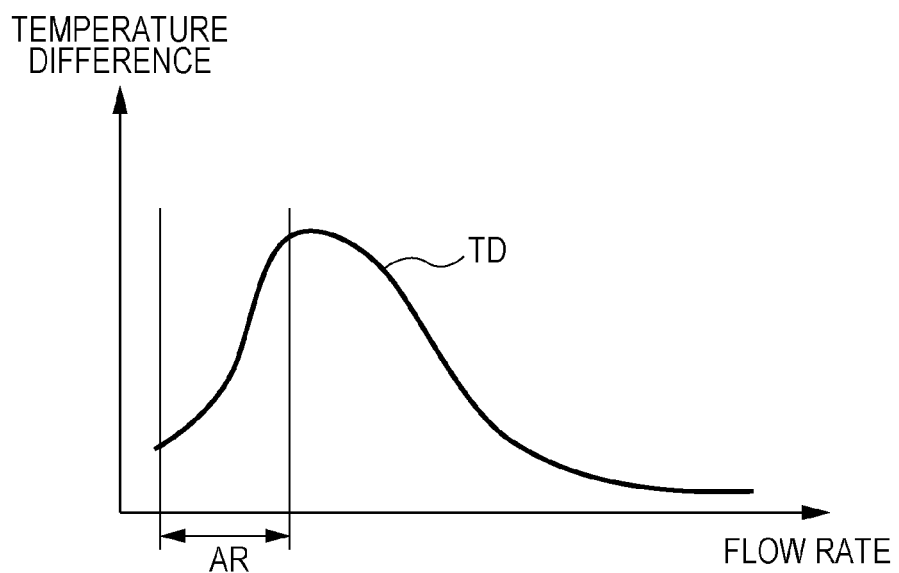
FIGS. 8A and 8B are diagrams illustrating a flow rate measurement principle of a three-wire thermal system.
Figure 8B:
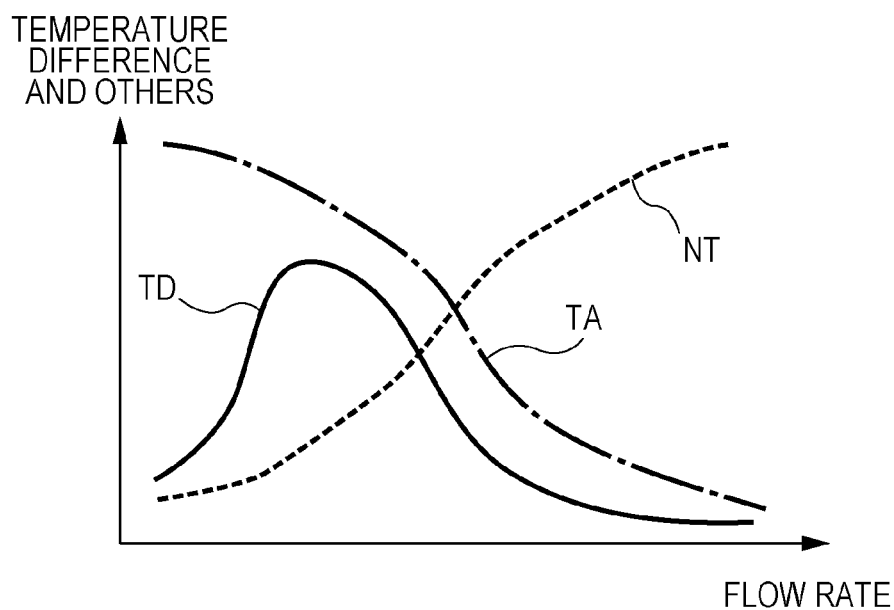

FIGS. 8A and 8B are diagrams illustrating a flow rate measurement principle. FIG. 8A depicts a differential system. FIG. 8B depicts a difference/sum system. In FIG. 8A, a horizontal axis represents a flow rate, and a vertical axis represents a temperature difference TD illustrated in FIG. 7. When a measured flow rate of a fluid to be measured falls in a range of AR, the arithmetic control unit 40 calculates a flow rate of a fluid to be measured by a differential operation.

However, since the range of AR is relatively narrow, it is sometimes difficult to measure a desired flow rate. In such a case, the arithmetic control unit 40 calculates a sum (a temperature sum) TA of a measured temperature of the temperature sensor 33 and a measured temperature of the temperature sensor 34 as illustrated in FIG. 8B. Then, the arithmetic control unit 40 divides the difference in temperature TD illustrated in FIG. 7 by the obtained temperature sum TA, thereby to calculate a normalized temperature difference signal NT.

Thus, when focusing on a measurement flow rate range, it is seen that the measurement flow rate range is wider than when only the temperature difference TD is used as a temperature difference signal.

Furthermore, such normalization of a temperature difference signal enables elimination of an influence by an ambient temperature.

Figure 9:
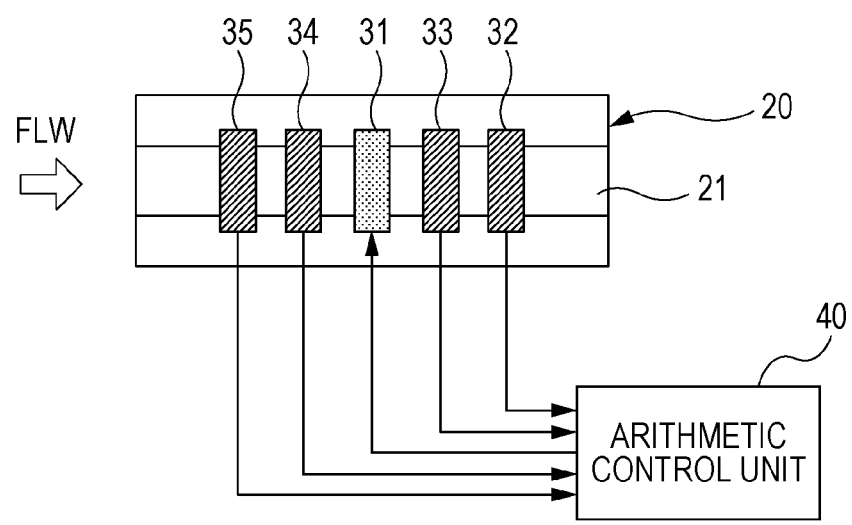
FIG. 9 is a diagram schematically illustrating the configuration of the micro flow sensor that performs a flow rate measurement with a TOF system.

FIG. 9 is a diagram schematically illustrating the configuration of the present micro flow sensor for measuring a flow rate by (3) thermal system (TOF (Time of Flight) system). In FIG. 9, the same signs are assigned to the components in common with those in FIG. 1A. As illustrated in FIG. 9, a heater 31 and temperature sensors 32 to 35 are connected to an arithmetic control unit 40. The temperature sensor 32 serves as a downstream sensor and/or a second downstream sensor. The temperature sensor 33 serves as a downstream sensor and/or a first downstream sensor. The temperature sensor 34 serves as an upstream sensor and/or a first upstream sensor. The temperature sensor 35 serves as an upstream sensor and/or a second upstream sensor.

Figure 10A:
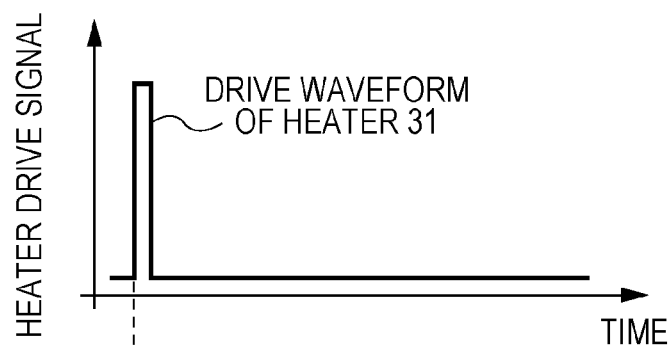
FIGS. 10A and 10B are diagrams for illustrating a measurement principle of a TOF system.
Figure 10B:
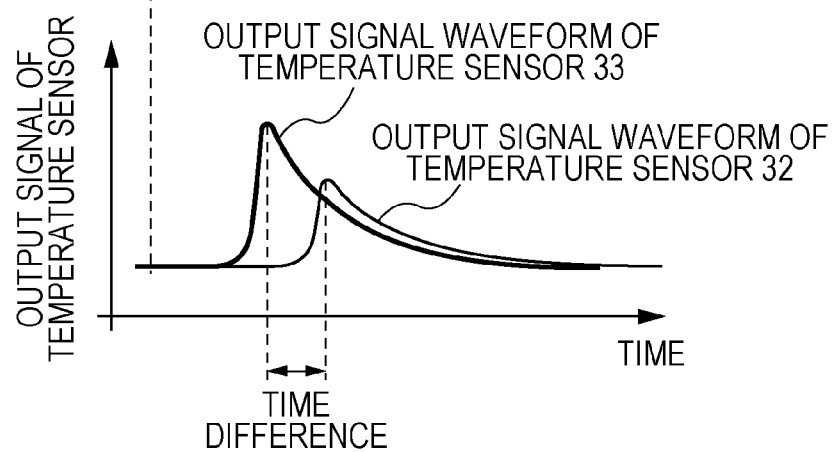

FIGS. 10A and 10B are diagrams illustrating a measurement principle of the TOF system. FIG. 10A depicts a drive waveform of the heater 31. FIG. 10B depicts an output signal waveform of the temperature sensor 32 and the temperature sensor 33.

The heater 31 illustrated in FIG. 9 is driven by the arithmetic control unit 40 so as to have a rectangular drive waveform as illustrated in FIG. 10A. The heater 31 locally heats a fluid to be measured flowing through a flow path FP.

As illustrated in FIG. 10B, the temperature sensor 32 and the temperature sensor 33 both located in a downstream side detect a temperature increase of a fluid to be measured locally heated by the heater 31. A difference between a time when the temperature sensor 32 has detected a temperature increase and a time when the temperature sensor 33 has detected a temperature increase depends on a flow rate of a fluid to be measured. It is noted that examples of a method for measuring this difference in time include (a) cross correlation method and (b) threshold method.

The arithmetic control unit 40 performs the predetermined arithmetic process as previously described, based on measured temperatures of the temperature sensors 32 and 33 both located in a downstream side. Thus, the arithmetic control unit 40 calculates a flow rate of a fluid to be measured.

Among the above three systems, (1) three-wire thermal system (differential system) is most suitable for measurement of a low flow rate region. For measurement of a flow rate range higher than the low flow rate region, (2) three-wire thermal system (difference/sum system) is suitable. In (3) TOF system, arrival of heat conveyed by a fluid to be measured is delayed in the low flow rate region. For this reason, the TOF system is not well suited to flow rate measurement of a low flow rate region. The TOF system is suitable for measurement in a flow rate region higher than the flow rate region suitable for measurement by the three-wire thermal system (difference/sum system). Therefore, one of these three systems is preferably used depending on a flow rate range. Thus, the present flow sensor can be applied to a wider flow rate range.

Figure 11:
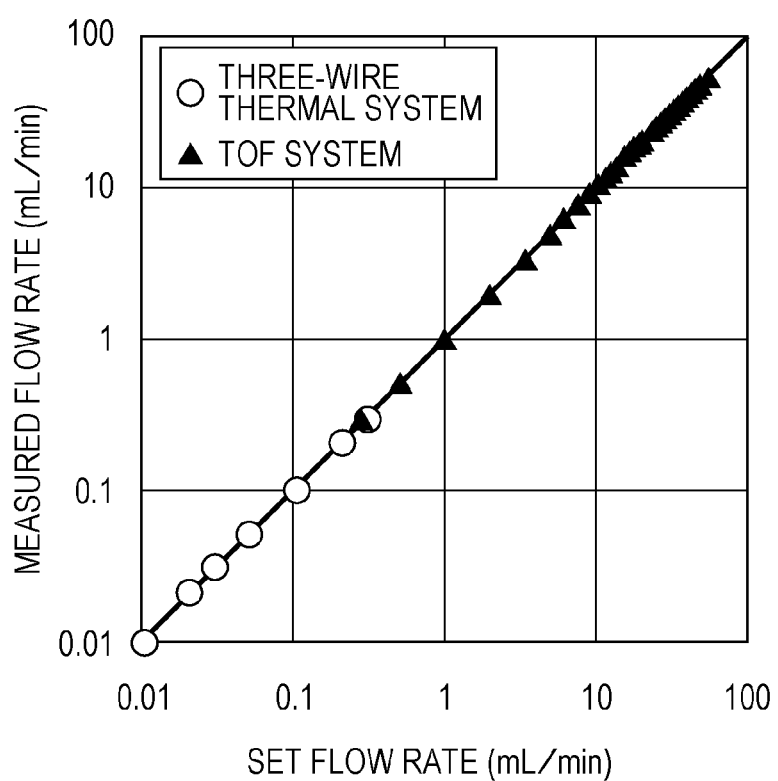
FIG. 11 is a diagram illustrating an example of measurement result characteristics of a three-wire thermal system (a difference/sum system) and a TOF system which are selectively used depending on a flow rate.

FIG. 11 is a diagram illustrating an example of measurement result characteristics when either (2) three-wire thermal system (difference/sum system) or (3) TOF system is used depending on a flow rate. FIG. 11 is a double logarithmic graph. In the graph, a horizontal axis represents a set flow rate, and a vertical axis represents a measured flow rate. As plotted by open circles, a flow rate is measured by (2) three-wire thermal system (difference/sum system) in a range of a set flow rate of 0.01 mL/min to 0.3 mL/min. As plotted by solid triangles, a flow rate is measured by (3) TOF system in a range of a set flow rate of 0.3 mL/min to 50 mL/min. These measurement results follow a line inclined at 45 degree.

The present flow sensor illustrated in FIGS. 1A to 1C has a structure including the narrowed portion (the stepped portion) arranged in the flow path. The detection unit 30 includes the heater 31 and the temperature sensors 32 to 35. Furthermore, in the present flow sensor, the detection unit 30 can be disposed on the other surface of the base plate 20. The surface is different from a connection surface with the base plate 10. In the base plate 20, the groove 21 constituting the flow path FP is formed. Thus, in the present flow sensor, the detection unit 30 can be inhibited from contacting with a fluid to be measured. Therefore, the present flow sensor has high corrosion resistance and chemical resistance.

It is noted that in the present flow sensor, a temperature signal related to heat generation of the heater 31 is corrected in a procedure described below. Thus, the present flow sensor can measure a flow rate of a fluid to be measured flowing through the flow path FP at high precision.

Figure 12A:
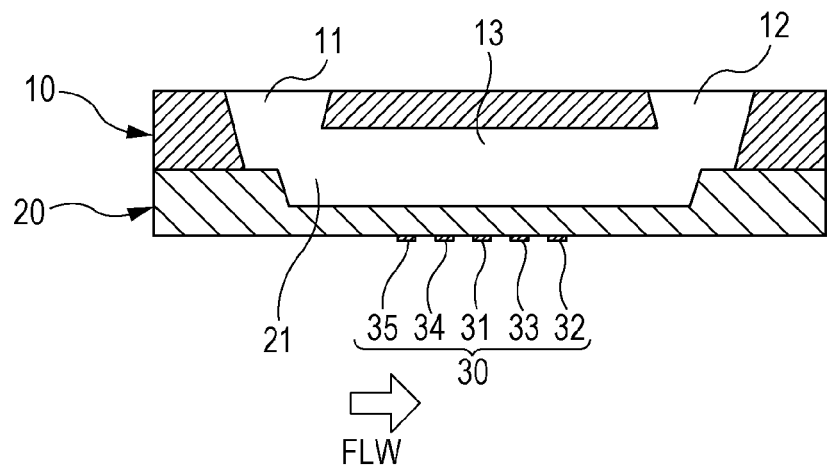
FIGS. 12A and 12B are simplified enlarged cross-sectional views of the micro flow sensor illustrated in FIG. 1B and part thereof, respectively.
Figure 12B:
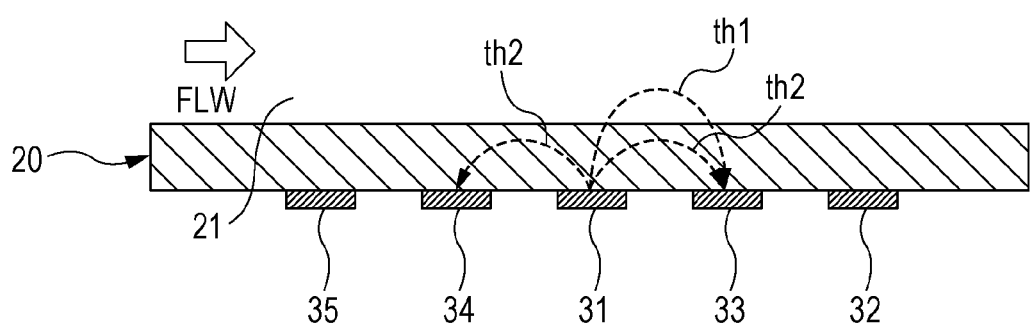
Figure 13:
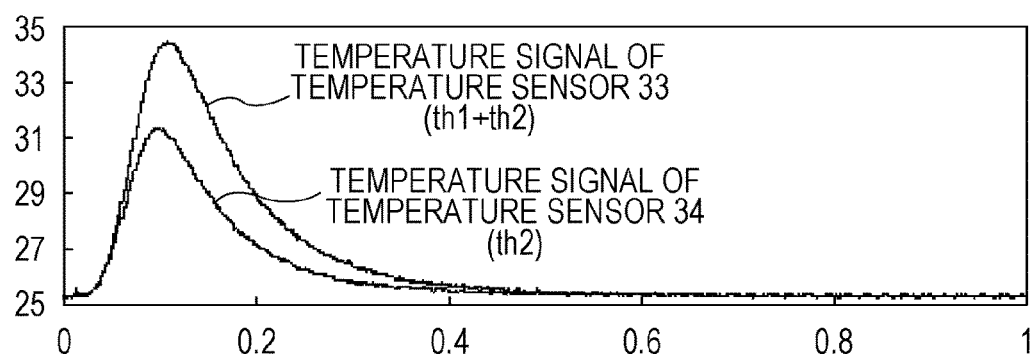
FIG. 13 is a diagram illustrating an example of temperature signal characteristics of temperature sensors.

FIGS. 12A and 12B are cross-sectional diagrams obtained by simplifying and enlarging FIG. 1B. FIG. 12A is an entire block diagram. FIG. 12B is an enlarged view of a periphery of the detection unit 30. The temperature sensors 33 and 34 are disposed after and before the heater 31 along a current of a fluid to be measured, so that the heater 31 is located between the temperature sensors 33 and 34. The temperature sensors 33 and 34 have temperature signal characteristics, for example, as illustrated in FIG. 13.

For example, when measuring a flow rate of a fluid to be measured flowing through the flow path FP by a TOF system, the arithmetic control unit 40 calculates a flow rate based on temperature signals output from the temperature sensors 32 and 33. These temperature sensors 32 and 33 are disposed on a downstream side of the heater 31. Here, focus is put on temperature information resulting from heat generation, of the heater 31, measured by the temperature sensor 33. A temperature signal of the temperature sensor 33 is obtained by superimposing a signal component resulting from heat th2 directly conducted via the base plate 20 on a signal component resulting from heat th1 conducted via a fluid to be measured. However, the signal component resulting from heat th2 directly conducted via the base plate 20 is a signal component (an error component) which becomes an error factor irrelevant to a flow rate of a fluid to be measured. For this reason, the arithmetic control unit 40 corrects this error component in order to measure a flow rate of a fluid to be measured at high precision.

On the other hand, the temperature sensor 34 is located on an upstream side of the heater 31. A distance between the temperature sensor 34 and the heater 31 is substantially equal to a distance between the temperature sensor 33 and the heater 31. Therefore, heat th1 conducted via a fluid to be measured does not reach the temperature sensor 34. Heat th2 directly conducted via the base plate 20 reaches the temperature sensor 34. That is, a temperature signal of the temperature sensor 34 can be considered to be substantially equal to a signal component resulting from Heat th2 directly conducted via the base plate 20.

Figure 14:
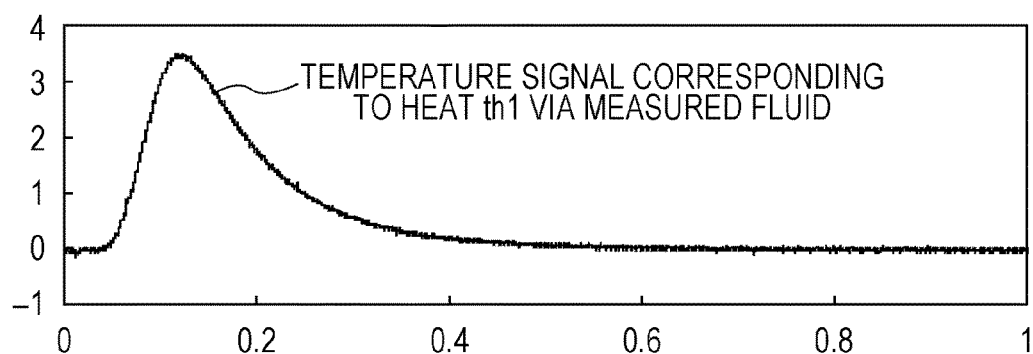
FIG. 14 is a diagram illustrating an example of temperature signal characteristics based on heat conducted via a fluid to be measured.

Therefore, a temperature signal resulting from heat th1 conducted via a fluid to be measured is extracted by subtracting a temperature signal of the temperature sensor 34 from a temperature signal of the temperature sensor 33. FIG. 14 depicts an example of a temperature signal, resulting from heat th1 conducted via a fluid to be measured, extracted as described above. Due to such a correction, more accurate flow rate measurement results of a fluid to be measured can be obtained.

It is noted that a positional relationship between the temperature sensor 32 and the temperature sensor 35 is similar to a positional relationship between the temperature sensor 33 and the temperature sensor 34. That is, the temperature sensor 32 is located on a downstream side of the heater 31. On the other hand, the temperature sensor 35 is located on an upstream side of the heater 31. A distance between the temperature sensor 35 and the heater 31 is substantially equal to a distance between the temperature sensor 32 and the heater 31.

Therefore, the arithmetic control unit 40 can extract a temperature signal resulting from a heat directly conducted to the temperature sensor 32 via a fluid to be measured, by subtracting a temperature signal of the temperature sensor 35 from a temperature signal of the temperature sensor 32, in a procedure similar to the above description. A flow rate measurement of a fluid to be measured can be performed more accurately.

Figure 15A:
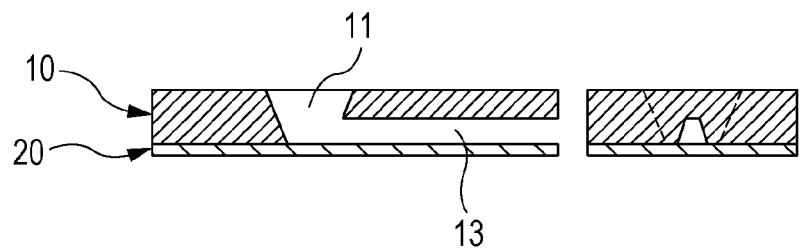
FIGS. 15A to 15C are diagrams illustrating the configurations of other examples of the present disclosure.

In the above example, grooves 13 and 21 each having a semicircular cross section are disposed in two base plates of the base plates 10 and 20 respectively. By connecting these two base plates of the base plates 10 and 20, a stepped portion is formed in a location of the inlet IN on an upstream side of the detection unit 30. However, an example of the present flow sensor is not limited to this. For example, as illustrated in FIG. 15A, the present flow sensor may have a base plate (a first base plate) 10 having a hole 11 illustrated in FIGS. 1A and 1B and a flat plate-like base plate (a second base plate) 20 which serves as a cover of the base plate 10. By connecting the base plate 10 and the base plate 20, a narrowed portion can be disposed in a location of the inlet IN on an upstream side of the detection unit 30.

Figure 15B:
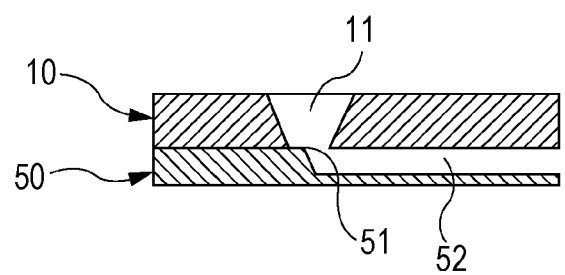
Figure 15C:
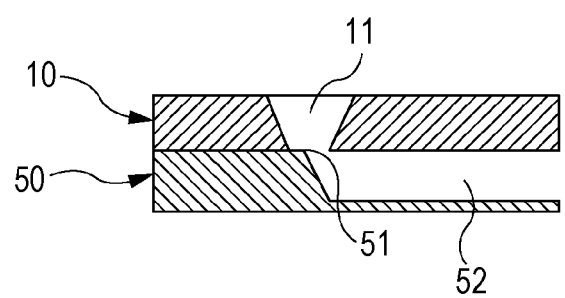

In an example illustrated in FIG. 15A, a hole 11 and a groove 13 are disposed in the base plate 10, and base plate 20 is formed into a flat plate-like shape. However, such a groove is not limited to be formed in the base plate 10. In examples illustrated in FIGS. 15B and 15C, the base plate 10 has a flat plate-like shape, and includes a hole 11 but does not include a groove. On the other hand, the base plate 50 includes a stepped portion 51 and a groove 52. The example illustrated in FIG. 15B and the example illustrated in FIG. 15C differ in sizes of the stepped portion 51 and the groove 52 in the base plate 50.

Figure 16A:
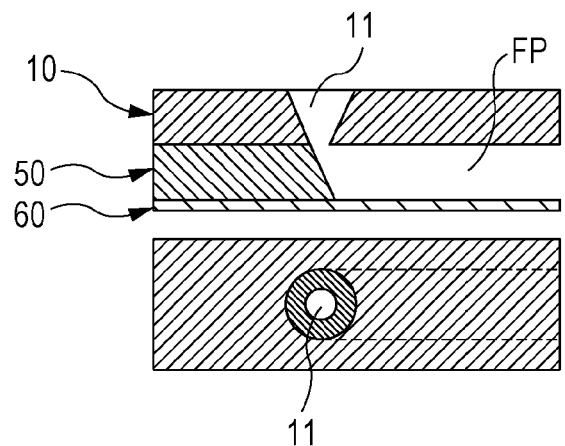
FIGS. 16A and 16B are diagrams illustrating the configurations of other examples of the present disclosure.
Figure 16B:
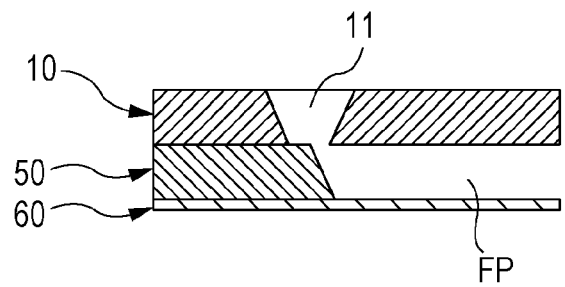

Also, the present flow sensor may include, as illustrated in FIGS. 16A and 16B, three base plates of base plates 10, 50 and 60. By connecting these three base plates, a narrowed portion is disposed. In the examples illustrated in FIGS. 16A and 16B, the base plate (a first base plate) 10 includes a hole 11. The base plate (a second base plate) 50 is an intermediate layer positioned between the base plate 10 and the base plate 60. The base plate 60 is formed into a flat plate-like shape. The base plate 60 serves as a cover of the base plates 10 and 50.

As illustrated in FIGS. 16A and 16B, the base plate 50 has a tapered surface. In the example illustrated in FIG. 16A, this tapered surface is combined with an inner wall of the hole 11 that is disposed in the base plate 10, thereby to form a narrowed portion without a stepped portion. In the example illustrated in FIG. 16B, a tapered surface of the base plate 50 is combined with an inner wall of the hole 11 that is disposed in the base plate 10, thereby to form a stepped portion.

The present flow sensors illustrated in FIGS. 15A, 15B, 15C, 16A and 16B each have the narrowed portion in the flow path on an upstream side of the detection unit 30. As a result, the present flow sensors have improved reproducibility of a flow velocity distribution and a flow rate measurement value compared to a flow sensor without a narrowed portion.

It is noted that the base plates 10, 20, 50 and 60 illustrated in the above examples are glass base plates subjected to a predetermined process. However, these base plates are not limited to glass base plates. These base plates may be, for example, ceramic base plates.

Figure 17:
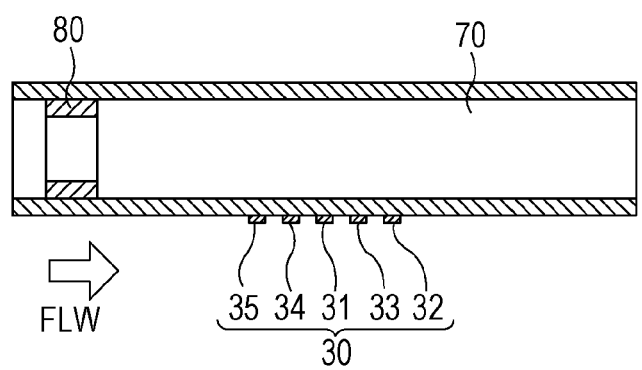
FIG. 17 is a diagram illustrating another example of the present disclosure.

Also, in the above examples, the flow path is formed by laminating and connecting base plates. However, an example of the flow path is not limited to this. An example of the flow path may include, as illustrated in FIG. 17, a tubular body 70 having a pipe- or tube-like shape. The tubular body 70 is made of, for example, a material having excellent corrosion resistance and chemical resistance. In an example illustrated in FIG. 17, the tubular body 70 includes a narrowed portion 80 formed therein. The narrowed portion 80 is formed by, for example, fitting and fixing a ring body into an inner wall on an upstream-side end of the tubular body 70.

Examples of the flow path and the narrowed portion formed (defined) in the flow path on an upstream side of the detection unit according to the present disclosure are not limited to the above examples. Various forms of the flow path and the narrowed portion are assumed.

As described above, the present flow sensor is a micro flow sensor for measuring a flow rate of a fluid by detecting a thermal transfer in a fluid. According to the present flow sensor, high reproducibility of a flow velocity distribution and a flow rate measurement value can be realized.

Also, the present flow sensor has excellent corrosion resistance and chemical resistance as well as high stability. Furthermore, in the present flow sensor, a zero point shift is reduced while a measurement flow rate range is widened. The present disclosure is particularly suitable for measurement of a micro flow rate.

It is noted that the micro flow sensor according to the present disclosure may be first to sixth micro flow sensors described below.

A first micro flow sensor measures a flow rate of a fluid to be measured flowing in a flow path, based on a thermal transfer detected by a detection unit. The detection unit includes a heater and a plurality of temperature sensors disposed outside the flow path. A narrowed portion is disposed on an upstream side of the flow path.

A second micro flow sensor is the first micro flow sensor in which at least two base plates are connected to each other. At least one of the two base plates includes a groove formed therein for constituting a flow path, and one of the two base plates include a hole disposed therein that communicates with the flow path. A detection unit is disposed outside the connected base plates so as to overlap the flow path. A narrowed portion is disposed inside the flow path located in an upstream side of the detection unit.

A third micro flow sensor is the second micro flow sensor in which a stepped portion is formed on an inner wall of an inlet of the flow path. The stepped portion functions as the narrowed portion.

A fourth micro flow sensor is the first micro flow sensor including two base plates. Each of the base plates include a groove disposed therein for forming a flow path, and one of the base plates include a hole in communication with the flow path. The two base plates are connected to each other so that the grooves form a flow path. A detection unit is disposed outside the connected base plates so as to overlap the flow path. A relationship of Du≤Dd is satisfied, when Du is a width of a groove disposed in the base plate including the detection unit disposed thereon, and Dd is a width of a groove disposed in the other glass base plate.

A fifth micro flow sensor is the first micro flow sensor in which the flow path is formed with a tubular body.

A sixth micro flow sensor is one of the first to fifth micro flow sensors in which an arithmetic correction of a flow rate is performed using output signals of the temperature sensors disposed on an upstream side of the heater.

According to the first to sixth micro flow sensors, the narrowed portion is provided inside the flow path. Therefore, a flow velocity distribution in a downstream side of the narrowed portion is stabilized. As a result, the first to sixth micro flow sensors have high reproducibility of a flow velocity distribution and a flow rate measurement value.

According to these micro flow sensors, a flow velocity distribution in a downstream side of a narrowed portion is stabilized, and high reproducibility of a flow velocity distribution and a flow rate measurement value can be achieved, by disposing the narrowed portion inside a flow path.

When the narrowed portion is disposed in the flow path, a flow velocity distribution at a time of entering the narrowed portion is once canceled at the narrowed portion, and a flow velocity distribution immediately under the narrowed portion depends on the shape of the narrowed portion. Then, an entrance region starts again from the narrowed portion in a downstream side of the narrowed portion. Taking advantage of this property, a narrowed portion is disposed inside a flow sensor so that the narrowed portion functions like a rectifier. That is, an influence of a flow velocity distribution in an upstream side of the narrowed portion is reduced to have a flow velocity distribution depending on the shape of the narrowed portion, such that a flow velocity distribution immediately under the narrowed portion is determined by the shape of the narrowed portion.

Here, the detection unit is located within an entrance region where a flow velocity distribution is changing. A flow velocity distribution in the detection unit is uniquely determined according to a shape of the narrowed portion and a distance from the narrowed portion. Therefore, an influence of a piping arranged on an upstream side of the flow sensor can be eliminated. Therefore, reproducibility of a flow rate measurement value can be improved.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A micro flow sensor, comprising:
   a flow path through which a fluid to be measured flows;
   a detection unit having:
      a heater configured to heat the fluid to be measured in the flow path, and
      temperature sensors configured to measure a temperature of the fluid to be measured in the flow path;
   an arithmetic unit configured to measure a flow rate of the fluid to be measured flowing through the flow path based on the temperature of the fluid to be measured, measured by the temperature sensors;
   a narrowed portion disposed on an upstream side of the detection unit in the flow path for narrowing the flow path; and
   a first base plate and a second base plate connected to each other, the first base plate has first and second surfaces, the second surface being a connection surface connected with the second base plate, the second base plate has third and fourth surfaces, the third surface being a connection surface connected with the second surface, wherein: the narrowed portion is provided on an inlet for introducing the fluid to be measured into the flow path and includes a stepped portion formed on the third surface of the second base plate at a boundary between the flow path and the inlet, wherein the stepped portion defines an inner side wall of the second base plate, the inner side wall partially overlapping the inlet, the detection unit is disposed outside of the narrowed portion in the flow path,
at least one of the base plates has a groove for defining the flow path,
the first base plate has the inlet,
the detection unit is disposed outside the second base plate to overlap the flow path,
the first and second base plates each have a groove for defining the flow path, and
a width Du of the groove in the second base plate and a width Dd of the groove in the first base plate satisfy a relationship of Du ≤Dd.

2. The micro flow sensor according to claim 1, wherein the temperature sensors include upstream sensors disposed on an upstream side of the heater and downstream sensors disposed on a downstream side of the heater.

3. The micro flow sensor according to claim 2, wherein a distance between the upstream sensors and the heater is equal to a distance between the downstream sensors and the heater.

4. The micro flow sensor according to claim 2, wherein
the upstream sensors include a first upstream sensor and a second upstream sensor,
the downstream sensors include a first downstream sensor and a second downstream sensor,
a distance between the first upstream sensor and the heater is equal to a distance between the first downstream sensor and the heater, and
a distance between the second upstream sensor and the heater is equal to a distance between the second downstream sensor and the heater.

5. The micro flow sensor according to claim 1, wherein the flow path (FP) includes a tubular body.

6. The micro flow sensor according to claim 2, wherein the arithmetic unit is configured to
detect the flow rate based on detection results of the downstream sensors, and then
correct the detected flow rate with detection results of the upstream sensors.

7. The micro flow sensor according to claim 1, wherein
the first base plate has opposite first and second surfaces, the second surface being a connection surface connected with the second base plate,
the inlet has first and second openings on the first and second surfaces of the first base plate, respectively, an opening diameter of the second opening of the inlet is smaller than an opening diameter of the first opening of the inlet, and
the stepped portion is formed on the second base plate, and partially overlaps the second opening of the inlet.

8. A micro flow sensor, comprising:
a first base plate and a second base plate connected to each other,
a flow path through which a fluid to be measured flows, the flow path being included in at least one of the first base plate and the second base plate;
an inlet provided in the first base plate, the inlet being configured to introduce a fluid into the flow path,
a detection unit having a heater configured to heat the fluid to be measured in the flow path, and
temperature sensors configured to measure a temperature of the fluid to be measured in the flow path, the detection unit being disposed outside the second base plate to overlap the flow path;
an arithmetic unit configured to measure a flow rate of the fluid to be measured flowing through the flow path based on the temperature of the fluid to be measured, measured by the temperature sensors; and
a narrowed portion disposed on an upstream side of the detection unit in the flow path for narrowing the flow path, wherein
the first base plate has opposite first and second surfaces, the second surface being a connection surface connected with the second base plate,
the second base plate has opposite third and fourth surfaces, the third surface being a connection surface connected with the second surface,
the inlet has first and second openings on the first and second surfaces of the first base plate, respectively, an opening diameter of the second opening of the inlet being smaller than an opening diameter of the first opening of the inlet,
the narrowed portion is provided on the inlet, and includes a stepped portion formed on the third surface of the second base plate at a boundary between the flow path and the inlet, wherein the stepped portion defines an inner side wall of the second base plate, the inner side wall partially overlapping the second opening of the inlet,
the stepped portion reduces a cross-sectional area of the opening diameter in the second surface of the second opening, and
the detection unit is disposed outside of the narrowed portion in the flow path.

* * * * *